US012344374B2

(12) United States Patent
Shoeb

(10) Patent No.: US 12,344,374 B2
(45) Date of Patent: Jul. 1, 2025

(54) OBSTACLE AVOIDANCE FOR AIRCRAFT FROM SHADOW ANALYSIS

(71) Applicant: WING Aviation LLC, Mountain View, CA (US)

(72) Inventor: Ali Shoeb, San Rafael, CA (US)

(73) Assignee: Wing Aviation LLC, Palo Alto, CA (US)

( * ) Notice: Subject to any disclaimer, the term of this patent is extended or adjusted under 35 U.S.C. 154(b) by 257 days.

(21) Appl. No.: 17/965,622

(22) Filed: Oct. 13, 2022

(65) Prior Publication Data

US 2024/0124137 A1   Apr. 18, 2024

(51) Int. Cl.
| | |
|---|---|
| G06T 7/70 | (2017.01) |
| B64C 39/02 | (2023.01) |
| B64D 47/08 | (2006.01) |
| G06V 10/24 | (2022.01) |
| G06V 10/25 | (2022.01) |
| G06V 10/50 | (2022.01) |

(Continued)

(52) U.S. Cl.
CPC ............ B64C 39/024 (2013.01); B64D 47/08 (2013.01); G06T 7/70 (2017.01); G06V 10/242 (2022.01); G06V 10/25 (2022.01); G06V 10/50 (2022.01); G06V 10/60 (2022.01); G06V 10/764 (2022.01); B64U 2201/10 (2023.01); G06T 2207/10032 (2013.01); G06T 2207/30252 (2013.01)

(58) Field of Classification Search
CPC .. B64C 39/024; B64D 47/08; B64U 2201/10; G05D 1/101; G06T 2207/10032; G06T 2207/30252; G06T 7/70; G06V 10/242; G06V 10/25; G06V 10/50; G06V 10/60; G06V 10/764; G06V 20/17; G06V 20/64; G06V 2201/121; G08G 5/0021; G08G 5/0052; G08G 5/0069; G08G 5/0086; G08G 5/045
USPC ........................................................ 701/301
See application file for complete search history.

(56) References Cited

U.S. PATENT DOCUMENTS

| | | | | |
|---|---|---|---|---|
| 5,963,653 A | * | 10/1999 | McNary | .................. G01S 7/417 342/64 |
| 11,074,447 B1 | * | 7/2021 | Fox | .......................... G06N 3/08 |
| 11,168,976 B2 | * | 11/2021 | Amthor | ..................... G06T 7/60 |

(Continued)

OTHER PUBLICATIONS

Jordan, An Overview of Semantic image segmentation, https://www.jeremyjordan.me/semantic-segmentation, downloaded from internet on Aug. 3, 2022, 18 pages.

(Continued)

*Primary Examiner* — Andrew R Dyer
(74) *Attorney, Agent, or Firm* — Christensen O'Connor Johnson Kindness PLLC

(57) ABSTRACT

A technique for avoiding obstacles by an unmanned aerial vehicle (UAV) includes: acquiring an aerial image of a ground area below the UAV; analyzing the aerial image to identify a shadow in the aerial image cast by an object rising from the ground area; determining a pixel length of the shadow in the aerial image; calculating an estimated height of the object based at least on the pixel length of the shadow and an angle of the sun when the aerial image is acquired; and generating a clearance zone around the object having at least one dimension determined based on the estimated height, wherein the clearance zone represents a region in space to avoid when navigating the UAV.

19 Claims, 7 Drawing Sheets

(51) Int. Cl.
  *G06V 10/60* (2022.01)
  *G06V 10/764* (2022.01)

(56) References Cited

U.S. PATENT DOCUMENTS

| | | | | |
|---|---|---|---|---|
| 11,417,088 | B2* | 8/2022 | Nishio | G06V 20/17 |
| 2011/0216962 | A1 | 9/2011 | Kim et al. | |
| 2020/0074674 | A1* | 3/2020 | Guo | G06V 20/54 |
| 2020/0293773 | A1* | 9/2020 | Loveland | G01J 1/44 |
| 2021/0026377 | A1* | 1/2021 | Huang | G08G 5/0034 |
| 2022/0108521 | A1 | 4/2022 | Sameer | |
| 2022/0205938 | A1* | 6/2022 | Michini | G05D 1/689 |
| 2022/0398841 | A1* | 12/2022 | Tsunashima | G06V 20/188 |
| 2023/0069829 | A1* | 3/2023 | Saint-Marc | B64C 39/024 |
| 2023/0073366 | A1* | 3/2023 | Hope | G06T 5/60 |
| 2023/0204326 | A1* | 6/2023 | Jones | F42B 30/006 |
| | | | | 244/3.16 |
| 2023/0251671 | A1* | 8/2023 | Krishnan | G05D 1/692 |
| | | | | 701/2 |
| 2023/0316640 | A1* | 10/2023 | Shen | G06T 7/564 |
| | | | | 345/629 |
| 2024/0070897 | A1* | 2/2024 | Thomasson | G06T 7/60 |
| 2025/0014161 | A1* | 1/2025 | Rakha | G06V 20/176 |

OTHER PUBLICATIONS

Kameyama et al., Estimating Tree Height and Volume Using Unmanned Aerial Vehicle Photography and SfM Technology, with Verification of Result Accuracy, www.mdpi.com/journal/drones, May 11, 2020, 21 pages.

Vazquez, et al., Image Segmentation in the Presence of Shadows and Highlights, ECCV 2008, Part IV, LNCS, 5305, pp. 1-14, 2008.

Friedman et al., Image Segmentation in Video Sequences: A Probabilistic Approach, Proceedings of the Thirteenth Conference on Uncertainty in Artificial Intelligence (UAI 1997) arXiv:1302.1539, 7 pages.

Image segmentation, Wikipedia Article, https://en.wikipedia.org/w/index.php?title=image_segmentation&oldid=1098934814, Jul. 18, 2022, 22 pages.

Yago et al., Leave-One-Out Kernel Optimization for Shadow Detection, Proceedings of the IEEE International Conference on Computer Vision, (ICCV), 2015, pp. 3388-3396.

Yago et al., Leave-One-Out Kernel Optimization for Shadow Detection and Removal, IEEE Transactions on Pattern Analysis and Machine Intelligence, 2016, 14 pages.

Yago et al. Large-scale training of shadow detectors with noisily-annotated shadow examples, Computer Vision—ECCV Sep. 17, 2016, vol. 9910. Springer, Cham.

Yago et al., Noisy Label Recovery for Shadow Detection in Unfamiliar Domains, Proceedings of the IEEE Conference on Computer Vision and Pattern Recognition (CVPR), 2016, pp. 3783-3792.

Ma et al., Shadow Segmentation and Compensation in High Resolution Satellite Images, IEEE International Geoscience and Remote Sensing Symposium, 2008, 4 pages.

The Franklin Institute, Tall Trees, https://www.fi.edu/science-recipes/tall-trees, downloaded from internet Sep. 27, 2022, 4 pages.

Le et al, A+D Net: Training a Shadow Detector with Adversarial Shadow Attenuation, Proceedings of the European Conference on Computer Vision (ECCV), 2018, pp. 662-678.

Paparoditis et al., "Building Detection and Reconstruction From Mid-and High-Resolution Aerial Imagery", Computer Vision and Image Understanding, vol. 72, No. 2, Nov. 1998, pp. 122-142, Article No. IV980722.

International Search Report and Written Opinion, mailed Dec. 1, 2023, in corresponding International Patent Application No. PCT/US2023/030964, 16 pages.

* cited by examiner

OBSTACLE AVOIDANCE FOR AIRCRAFT FROM SHADOW ANALYSIS

TECHNICAL FIELD

This disclosure relates generally to obstacle avoidance for aircraft, and in particular but not exclusively, relates to avoidance of ground-based obstacles for unmanned aerial vehicles using aerial photography.

BACKGROUND INFORMATION

An unmanned vehicle, which may also be referred to as an autonomous vehicle, is a vehicle capable of traveling without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration/reconnaissance, imaging, public safety, surveillance, or otherwise. The mission definition will often dictate a type of specialized equipment and/or configuration of the unmanned vehicle.

Unmanned aerial vehicles (also referred to as drones) can be adapted for package delivery missions to provide an aerial delivery service. One type of unmanned aerial vehicle (UAV) is a vertical takeoff and landing (VTOL) UAV. VTOL UAVs are particularly well-suited for package delivery missions. The VTOL capability enables a UAV to takeoff and land within a small footprint thereby providing package pick-ups and deliveries almost anywhere. To safely deliver packages in a variety of environments (particularly environments of first impression), the UAV should be capable of identifying and judging the height of ground-based obstacles within their vicinity.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation for aiding unmanned aerial vehicles (UAVs) to avoid ground-based obstacles by analyzing the shadows cast by those obstacles are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments disclosed herein provide a technique for UAVs to identify ground-based obstacles from aerial imagery, estimate their height based upon their shadows, and set or adjust clearance zones around those obstacles to safely navigate in an obstacle-laden environment. The techniques are particularly well-suited to identify tall slender objects (e.g., telephone poles, streetlights, radio towers, cranes, trees, etc.) that can be difficult to identify from above solely using stereoscopic computer vision. Tall, slender objects present a particular challenge to identify and estimate height from an aerial perspective due to their small plan view footprint when viewed from above. This small footprint provides relatively little visual information for estimating height using conventional depth perception from stereovision. However, shadows cast by these obstacles due to obliquely incident sunlight can provide significant visual clues for not only identifying these obstacles (e.g., classifying the obstacle type), but also inferring/estimating the height of these obstacles. The estimated height of the obstacles can then be used not only for real-time avoidance, but also for updating backend maps (e.g., reference models) of ground areas to the benefit of future UAV missions. Maintaining up-to-date reference models of the environment in which UAVs are operating is a significant benefit for an aerial delivery service.

Figure 1:
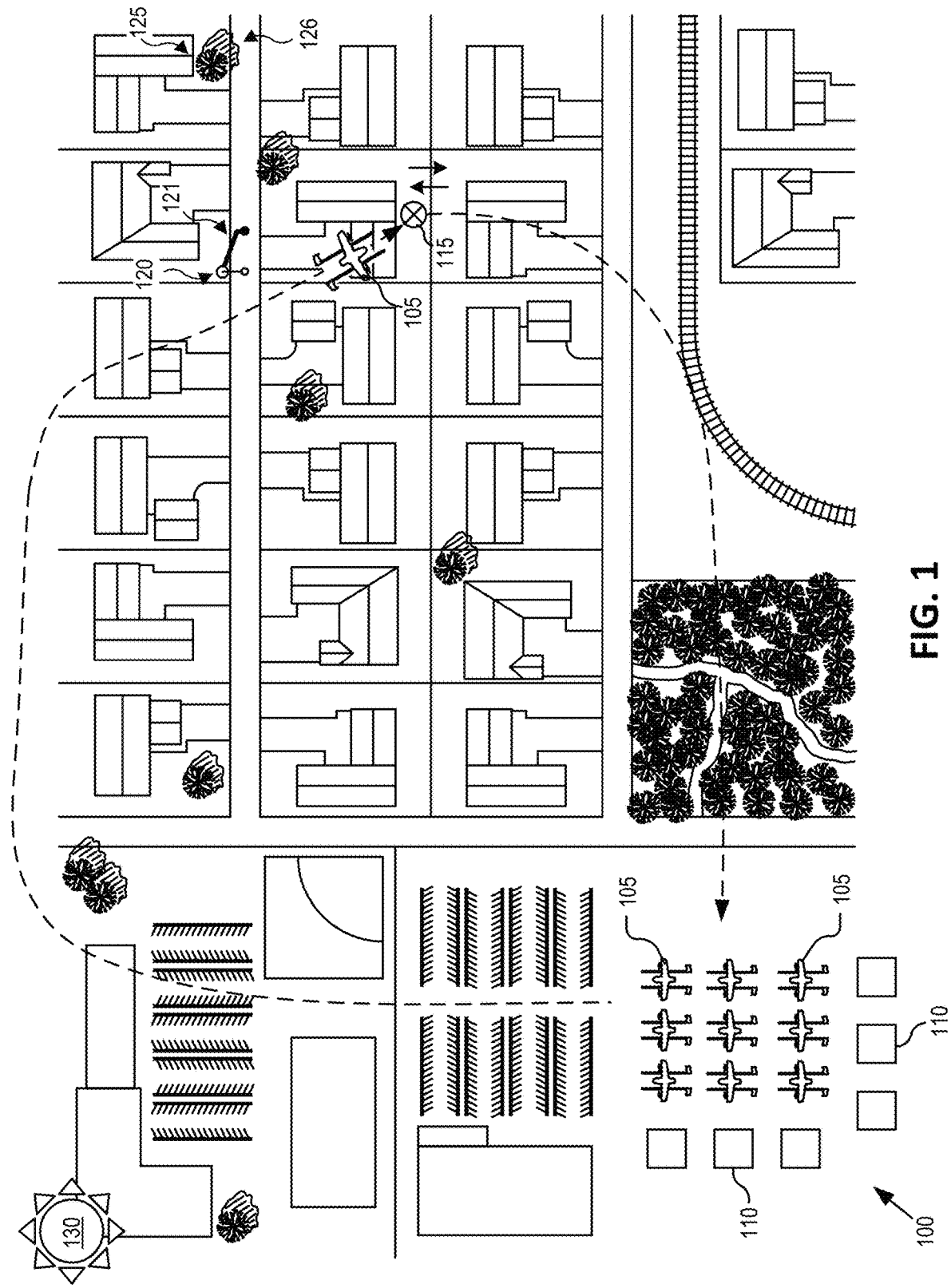
FIG. 1 illustrates a fleet of unmanned aerial vehicles (UAVs) staged at a terminal area to provide a package delivery service to a neighborhood, in accordance with an embodiment of the disclosure.

FIG. 1 is a plan view illustration of a terminal area 100 for staging UAVs 105 that deliver packages to a neighborhood, in accordance with an embodiment of the disclosure. UAVs may one day routinely deliver small items into urban or suburban neighborhoods from small regional or neighborhood hubs such as terminal area 100. Vendor facilities 110 may setup adjacent to terminal area 100 to take advantage of the aerial delivery service. A typical aerial delivery mission may include loading a UAV 105 with a package from a vendor facility 110 at terminal area 100, where it ascends to a cruise altitude enroute to a customer destination 115. At destination 115 UAV 105 descends for package drop-off before once again ascending to a cruise altitude for the return journey back to terminal area 100.

During the course of a delivery mission, ground based obstacles may be an ever present hazard—particularly tall slender obstacles such as streetlights 120, telephone poles, radio towers, cranes, trees 125, etc. Some of these obstacles may be persistent unchanging obstacles (e.g., streetlights, telephone poles, radio towers, etc.) while others may be temporary (cranes, etc.), or ever changing/growing (e.g., trees). Regardless, identification and avoidance of these obstacles is important for safe UAV navigation. These ground-based obstacles may be tall enough to present a hazard during cruise flight segments enroute to-and-fro destination 115 or present an acute hazard when descending to destination 115 or ascending from destination 115. Accordingly, embodiments described herein leverage shadows 121 or 126 cast by these obstacles from sun 130 for identification, height estimation, real-time obstacle avoidance, and backend reference model building/updating.

Figure 2:
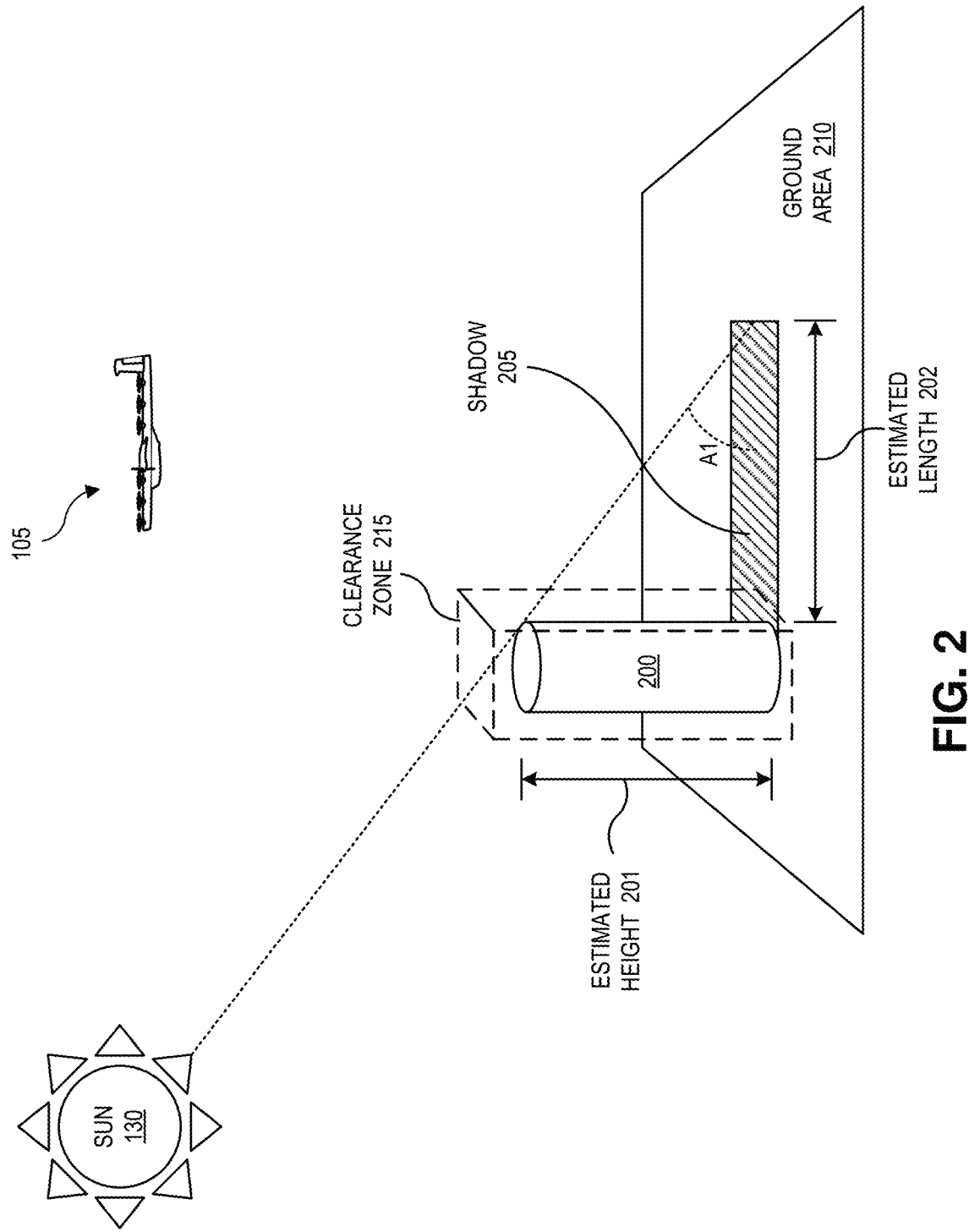
FIG. 2 illustrates how a UAV can estimate the height of an object by measuring the length of its shadow from an aerial image, in accordance with an embodiment of the disclosure.

FIG. 2 illustrates how a UAV 105 can estimate the height 201 of an obstacle/object 200 by measuring the length of its shadow 205 from an aerial image, in accordance with an embodiment of the disclosure. The angle of the sun A1 (i.e., angle of incidence of sunlight) can be used to calculate estimate height 201 from an estimated length 202 of shadow 205. Estimated length 202 may be measured from an aerial image of ground area 210 by counting a pixel length of shadow 205 in the aerial image and correlating this pixel length to an estimate length 202 of the shadow based upon knowledge of a height over the ground (e.g., altitude) of UAV 105 and camera geometry (e.g., camera focal length, etc.) used to acquire the aerial image. Angle of the sun A1 may be determined based upon a lookup table indexed to time, date, and location (e.g., GPS coordinates) of UAV 105 at the time of acquiring the aerial image. Accordingly, all the information needed to calculate estimated height 201 of ground-based obstacle 200 from an aerial image of ground area 210 is either known or measurable from onboard sensors of UAV 105.

Figure 3A:
FIG. 3A illustrates an aerial image acquired from a UAV that includes objects rising from the ground and the shadows cast by those objects, in accordance with an embodiment of the disclosure.
Figure 4A:
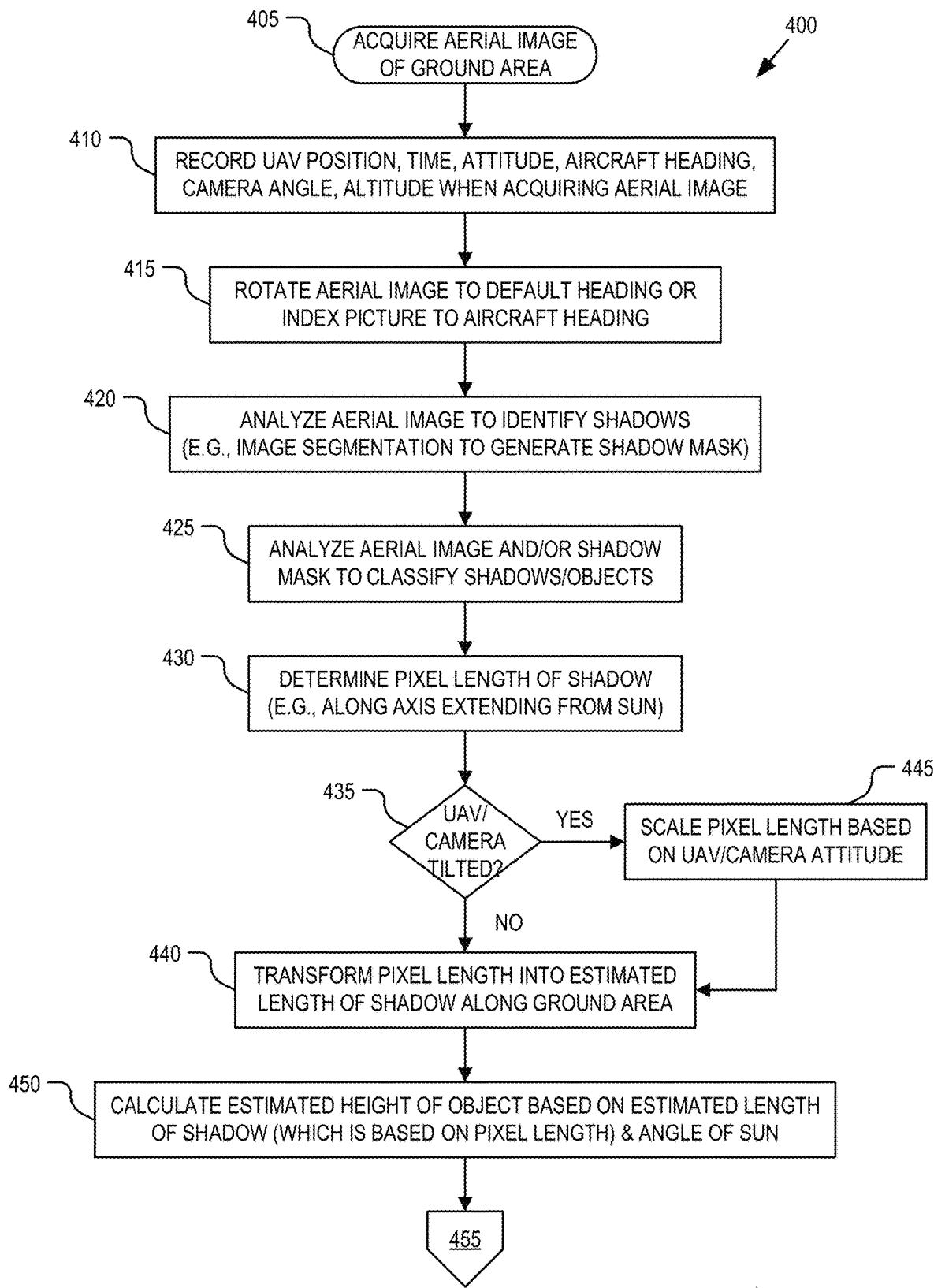
FIGS. 4A and 4B include a flow chart of a process for avoiding obstacles by UAVs, in accordance with an embodiment of the disclosure.
Figure 4B:
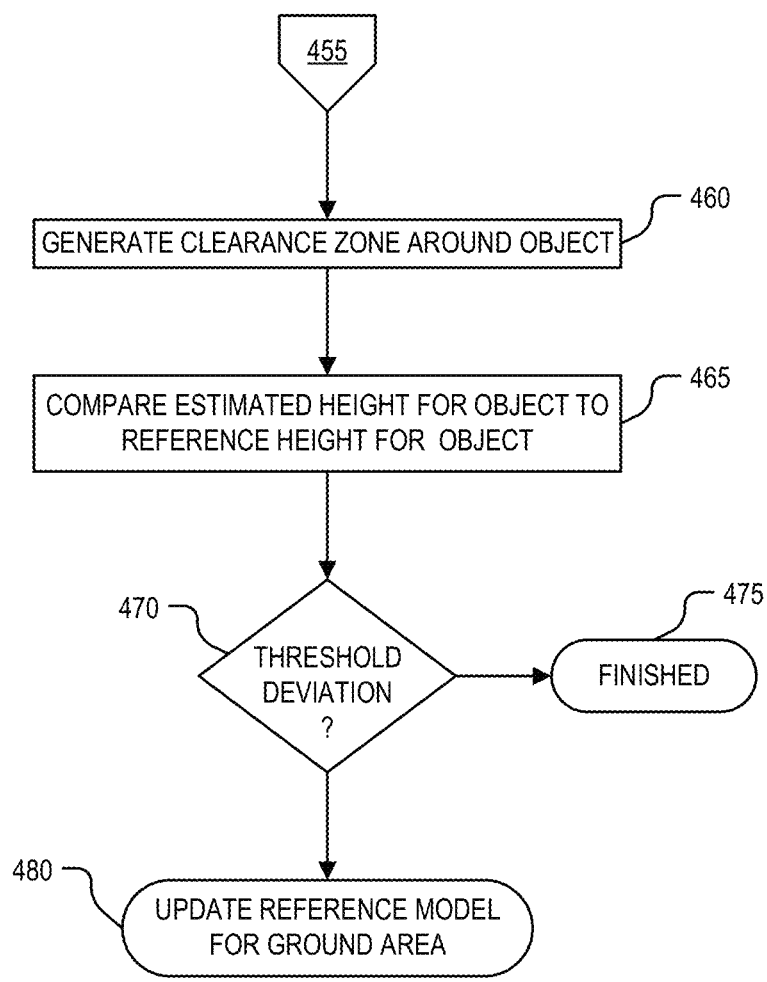

FIG. 3A illustrates an example aerial image 300 including a tree 305 and a streetlight 310, which represent example instances of ground-based obstacle 200. As can be seen in aerial image 300, tree 305 and streetlight 310 are not easily identifiable in the picture; however, their shadows 315 and 320, respectively, are quite noticeable from the aerial vantage point. FIGS. 4A and 4B include a flow chart of a process 400 for avoiding obstacles, such as tree 305 and streetlight 310, by UAVs 105 using shadows, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

Process 400 begins with UAV 105 capturing an aerial image, such as aerial image 300, of ground area 210 (process block 405). The aerial image is captured with a downward facing, onboard camera system. For example, the camera system may be a stereovision camera system that also provides stereoscopic machine vision. Aerial images may be continuously captured (e.g., 30 frames per second) throughout the course of an aerial delivery mission during both cruise and hover segments, periodically captured at specified time intervals, captured only while operating in a hover mode while descending to or ascending from delivery location 115, captured on-demand as deemed necessary in response to triggers or flags asserted by the stereoscopic machine vision, when entering geographic areas with untrusted reference models, when entering geographic areas deemed to be high risk for ground-based obstacles, or otherwise.

In connection with capturing aerial image 300, UAV 105 also records or indexes aerial image 300 to a number of situational details present when acquiring the aerial image. These situational details may include one or more of: the UAV's geographical position (e.g., GPS coordinates, latitude/longitude, etc.), time and date, altitude, aircraft heading, and/or aircraft attitude. If the camera system is adjustable (e.g., variable zoom, gimbal mounted, etc.), then camera angle and focal length may also be recorded and indexed to aerial image 300. Of course, not all of these situational details need to be recorded in all scenarios. For example, if UAV 105 has a fixed camera with fixed optical power and only acquires aerial images 300 during level flight, then camera details and aircraft attitude can be assumed.

In a process block 415, the aircraft heading (e.g., magnetic or GPS compass reading) is used to rotate aerial image 300 to a default orientation. For example, aerial image 300 may be rotated to a north up orientation, though other default orientations may be selected. Image rotation to a default orientation simplifies image analysis to identify shadows as their direction opposite sun 130 can be predicted (based on date, time, and location) relative to objects in aerial image 300. Knowledge of the expected direction of shadows can improve shadow analysis using machine learning models. Alternatively, the aircraft heading may simply be saved and indexed with aerial image 300 and then referenced when analyzing aerial image 300 to improve shadow analysis.

In a process block 420, aerial image 300 is analyzed to identify shadows 315 and 320. Shadow identification may be performed using a variety of different techniques. In one embodiment, a machine learning (ML) model trained to identify shadows is used. The training may be performed using a training dataset of images that includes ground truth labels inserted by humans. Additional details such as time, date, location, altitude, UAV attitude, UAV heading, angle of the sun, etc. may also be fed into the ML model. In yet another embodiment, image segmentation is executed to identify the shadows. The image segmentation may be performed by applying intensity thresholds to groups of pixels to identify dark regions indicative of a shadow. Of course, other image segmentation and/or image analysis techniques may be used to identify shadows of relevance in the aerial images.

Figure 3B:
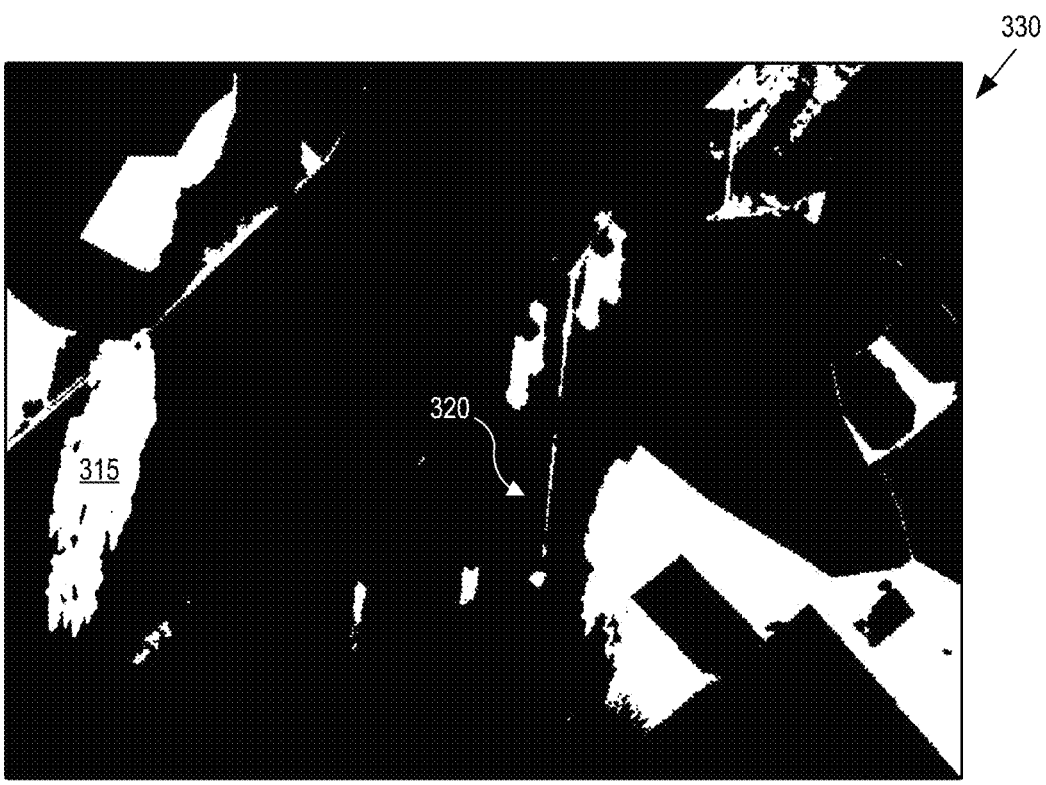
FIG. 3B illustrates a shadow mask image that binarizes the aerial image by classifying pixels as either a shadow pixel or a non-shadow pixel, in accordance with an embodiment of the disclosure.

In one embodiment, image segmentation and/or intensity thresholding is a sub-step of process block 420 to generate a shadow mask image 330 (see FIG. 3B) from the analysis of aerial image 300. Shadow mask image 330 classifies pixels in aerial image 300 as either a shadow pixel (illustrated as white pixels) or a non-shadow pixel (illustrated as black pixels). In the illustrated embodiment, shadow mask image 330 is a binary, black and white image. Contiguous groupings of shadow pixels greater than a threshold size or having characteristic shapes, may be classified as a shadow of interest. Shadow mask image 330 serves to clearly identify shadow pixels in aerial image 300.

In a process block 425, aerial image 300 and/or shadow mask image 330 are further analyzed to classify the objects/ obstacles in image 300 casting shadows 315 and 320 into object types. Both the object/obstacle itself and its shadow may carry relevant information for this classification. The classification may simply be whether the obstacle is a hard or soft object, or the classification may be a more specific classification such as an identification of the object casting the shadow (e.g., streetlight, pole, tower, crane, tree, building, etc.). This optional classification can be used to inform process block 460, (described below).

The image analysis and processing described above in connection with process blocks 410, 420, and 425, may be performed onboard UAV 105 or offloaded to the cloud for backend processing. In one embodiment, onboard control systems of UAV 105 include one or more processors or controllers (e.g., central processing units, graphic processing units, neural networks executing trained machine learning models, etc.) for analyzing aerial image 300 and/or shadow mask image 330. In yet another embodiment, UAV 105 wirelessly communicates aerial image 300 to a backend server for cloud-based image analysis.

Returning to FIG. 4A, the pixel length of a selected shadow (e.g., shadow 320) in aerial image 300 is determined (process block 430). The pixel length may be counted along an axis extending from the direction of sun 130 to the obstacle (referred to as the sun-to-object axis). As mentioned above, the direction of sun 130 is determinable based upon the location, date, and time of UAV 105 when acquiring aerial image 300. Pixel length may be determined by counting the number of pixels of the shadow falling linearly along the sun-to-object axis. In one embodiment, pixel length is determined from counting a line of pixels in shadow mask image 330 falling in the selected shadow along the sun-to-object axis.

In a process block 440, the pixel length is transformed into an estimated length 202 of the shadow. This transformation may be determined based upon the altitude (e.g., height over ground area 210) and optical power or focal length of the onboard camera system; however if the measured attitude of UAV 105 indicates aerial image 300 was acquired during a pitch or roll maneuver or that the onboard camera system was tilted, (decision block 435), then the pixel length may be scaled (process block 445) to account for the oblique angle of the aerial image.

With the pixel length counted and estimated length 202 of the shadow determined, estimate height 201 of obstacle 200 (e.g., streetlight 310) is calculable. Estimated height 201 is a geometric calculation using the tangent of the angle of the sun A1 and estimate length 202. The angle of the sun A1 may be determined based on the position, date, and time when aerial image 300 was acquired. In one embodiment, the angle of the sun A1 is indexed to time in one or more lookup tables accessible to UAV 105.

Process 400 continues to a process block 460 in FIG. 4B (see off page reference 455). With estimated height 201 of obstacle 200 (e.g., streetlight 310) determined, an appropriate clearance zone 215 around obstacle 201 may be specified. In one embodiment, clearance zone 201 has at least one dimension (e.g., vertical height) specified based on estimated height 201. For example, the height of clearance zone 215 may add an offset value (e.g., 5 m) to estimate height 201. Clearance zone 201 represents a region in space for UAV 105 to avoid when navigating over ground area 210. In one embodiment, the size of clearance zone 201 is further adjusted based upon the type of object assigned to obstacle 200, which may be determined from the object classification performed in process block 425. For example, objects deemed more dangerous, more vulnerable, more fragile, or more variable/difficult to estimate may be provided with larger clearance zone 215 than other objects/obstacles deemed less dangerous, etc.

Estimated height 201 may be used by UAV 105 to provide real-time evaluations of hazards and dynamic generation of clearance zones 215 around obstacles encountered during a mission. Additionally (or alternatively), estimated height 201 may be provided to a backend mission planning system to update a reference model of ground area 210 used by UAV 105 and future UAVs when navigating over ground area 210. As such, estimate height 201 for obstacle 200 may be compared against a reference height for obstacle 200 maintained with a reference model for ground area 210 (process block 465). If estimated height 201 deviates by at least a threshold amount from the reference height (decision block 470), then aerial image 300 and/or estimated height 201 may be saved and provided to the backend mission planning system to update the reference model (process block 480). Otherwise, process 400 completes at process block 475.

Figure 5A:
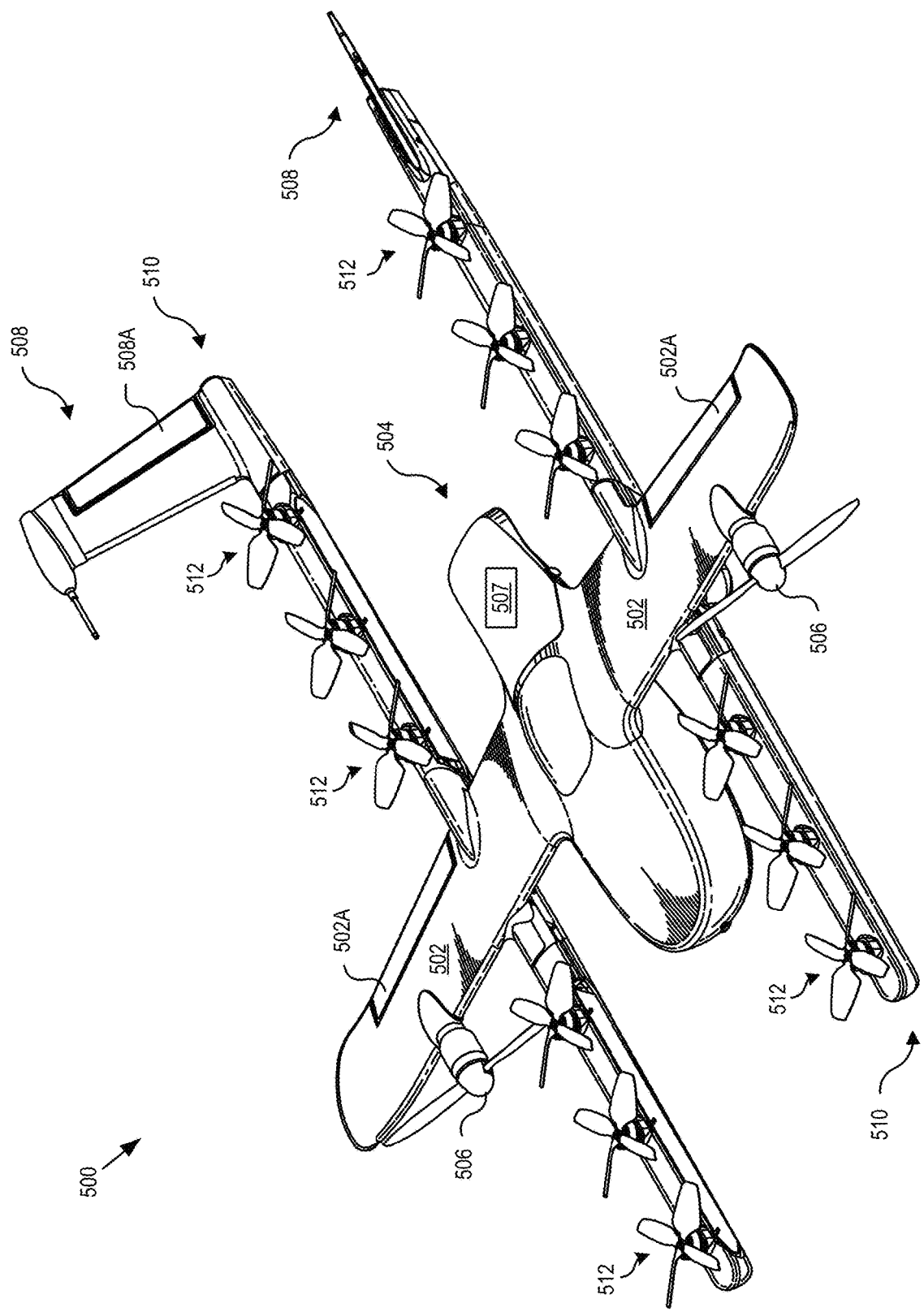
FIG. 5A is a perspective view illustration of a UAV that avoids obstacles rising from the ground by analyzing their shadows, in accordance with an embodiment of the disclosure.
Figure 5B:
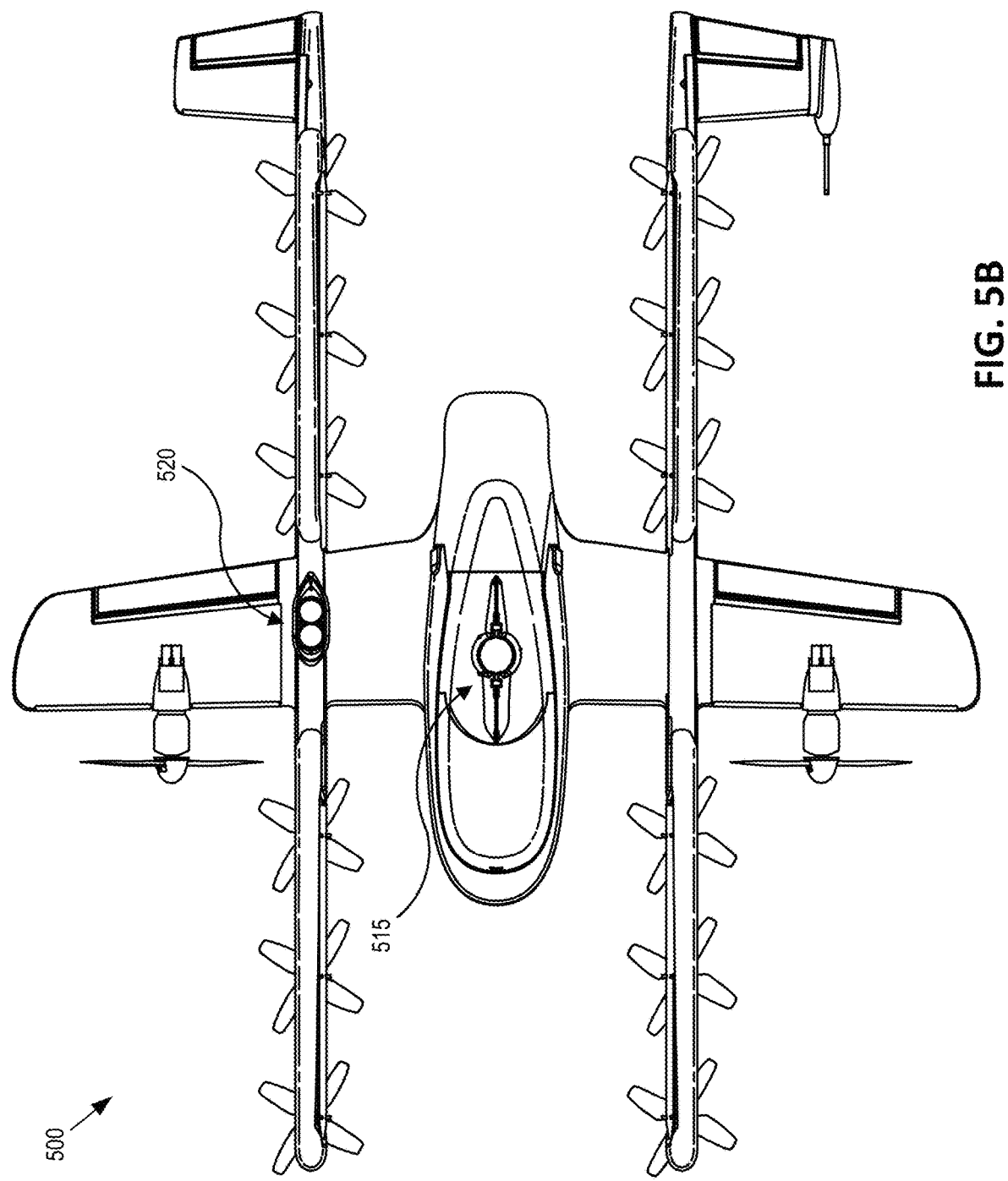
FIG. 5B is an underside plan view of the UAV that avoids obstacles rising from the ground by analyzing their shadows, in accordance with an embodiment of the disclosure.

FIGS. 5A and 5B illustrate a UAV 500 that is well suited for delivery of packages, in accordance with an embodiment of the disclosure. FIG. 5A is a topside perspective view illustration of UAV 500 while FIG. 5B is a bottom side plan view illustration of the same. UAV 500 is one possible implementation of UAVs 105 illustrated in FIG. 1, although other types of UAVs may be implemented as well.

The illustrated embodiment of UAV 500 is a vertical takeoff and landing (VTOL) UAV that includes separate propulsion units 506 and 512 for providing horizontal and vertical propulsion, respectively. UAV 500 is a fixed-wing aerial vehicle, which as the name implies, has a wing assembly 502 that can generate lift based on the wing shape and the vehicle's forward airspeed when propelled horizontally by propulsion units 506. The illustrated embodiment of UAV 500 has an airframe that includes a fuselage 504 and wing assembly 502. In one embodiment, fuselage 504 is modular and includes a battery module, an avionics module, and a mission payload module. These modules are secured together to form the fuselage or main body.

The battery module (e.g., fore portion of fuselage 504) includes a cavity for housing one or more batteries for powering UAV 500. The avionics module (e.g., aft portion of fuselage 504) houses flight control circuitry of UAV 500, which may include a processor and memory, communication electronics and antennas (e.g., cellular transceiver, wifi transceiver, etc.), and various sensors (e.g., global positioning sensor, an inertial measurement unit, a magnetic compass, a radio frequency identifier reader, etc.). Collectively, these functional electronic subsystems for controlling UAV 500, communicating, and sensing the environment may be referred to as a control system 507. The mission payload module (e.g., middle portion of fuselage 504) houses equipment associated with a mission of UAV 500. For example, the mission payload module may include a payload actuator 515 (see FIG. 2B) for holding and releasing an externally attached payload (e.g., package for delivery). In some embodiments, the mission payload module may include camera/sensor equipment (e.g., camera, lenses, radar, lidar, pollution monitoring sensors, weather monitoring sensors, scanners, etc.). In FIG. 2B, an onboard camera 520 is mounted to the underside of UAV 500 to support a computer vision system (e.g., stereoscopic machine vision) for visual triangulation and navigation as well as operate as an optical code scanner for reading visual codes affixed to packages. These visual codes may be associated with or otherwise match to delivery missions and provide the UAV with a handle for accessing destination, delivery, and package validation information.

As illustrated, UAV 500 includes horizontal propulsion units 506 positioned on wing assembly 502 for propelling UAV 500 horizontally. UAV 500 further includes two boom assemblies 510 that secure to wing assembly 502. Vertical propulsion units 512 are mounted to boom assemblies 510. Vertical propulsion units 512 providing vertical propulsion. Vertical propulsion units 512 may be used during a hover mode where UAV 500 is descending (e.g., to a delivery location), ascending (e.g., at initial launch or following a delivery), or maintaining a constant altitude. Stabilizers 508 (or tails) may be included with UAV 500 to control pitch and stabilize the aerial vehicle's yaw (left or right turns) during cruise. In some embodiments, during cruise mode vertical propulsion units 512 are disabled or powered low and during hover mode horizontal propulsion units 506 are disabled or powered low.

During flight, UAV 500 may control the direction and/or speed of its movement by controlling its pitch, roll, yaw, and/or altitude. Thrust from horizontal propulsion units 506 is used to control air speed. For example, the stabilizers 508 may include one or more rudders 508a for controlling the aerial vehicle's yaw, and wing assembly 502 may include elevators for controlling the aerial vehicle's pitch and/or ailerons 502a for controlling the aerial vehicle's roll. While the techniques described herein are particularly well-suited for VTOLs providing an aerial delivery service, it should be appreciated that analyzing shadow lengths to infer the heights of ground-based obstacles is applicable to a variety of aircraft types (not limited to VTOLs) providing a variety of services or serving a variety of functions beyond package deliveries.

Many variations on the illustrated fixed-wing aerial vehicle are possible. For instance, aerial vehicles with more wings (e.g., an "x-wing" configuration with four wings), are also possible. Although FIGS. 5A and 5B illustrate one wing assembly 502, two boom assemblies 510, two horizontal propulsion units 506, and six vertical propulsion units 512 per boom assembly 510, it should be appreciated that other variants of UAV 500 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for avoiding obstacles, the method comprising:
    acquiring an aerial image of a ground area below an unmanned aerial vehicle (UAV);
    analyzing the aerial image to identify a shadow in the aerial image cast by an object rising from the ground area;
    determining a pixel length of the shadow in the aerial image;
    transforming the pixel length of the shadow in the aerial image into an estimated length of the shadow along the ground area based at least in part on a UAV height above the ground area when acquiring the aerial image;
    calculating an estimated height of the object based at least on the estimated length of the shadow transformed from the pixel length of the shadow using the UAV height above the ground area when acquiring the aerial image, and an angle of the sun when the aerial image is acquired; and
    generating a clearance zone around the object having at least one dimension determined based on the estimated height, wherein the clearance zone represents a region in space to avoid when navigating the UAV.

2. The method of claim 1, further comprising:
    measuring a position of the UAV and a time when acquiring the aerial image; and
    determining the angle of the sun when the aerial image was acquired based on the position of the UAV and the time.

3. The method of claim 2, further comprising:
measuring one or both of an attitude of the UAV or an angle of a camera when acquiring the aerial image,
wherein transforming the pixel length of the shadow into the estimated length is based on the UAV height above the ground area and at least one of the attitude of the UAV or the angle of the camera.

4. The method of claim 1, further comprising:
measuring an aircraft heading of the UAV when acquiring the aerial image; and
rotating the aerial image to a default orientation based on the aircraft heading prior to the analyzing of the aerial image and determining the pixel length.

5. The method of claim 1, wherein analyzing the aerial image to identify the shadow comprises analyzing the aerial image with a machine learning model to identify the shadow, the method further comprising:
measuring an aircraft heading of the UAV when acquiring the aerial image;
providing the aircraft heading to the machine learning model while analyzing the aerial image to identify the shadow.

6. The method of claim 1, wherein analyzing the aerial image to identify the shadow in the aerial image cast by the object comprises applying one or more intensity thresholds to the aerial image to identify the shadow.

7. The method of claim 1, wherein analyzing the aerial image to identify the shadow in the aerial image cast by the object comprises executing a machine learning model trained to identify shadows.

8. The method of claim 1, further comprising:
executing a machine learning model trained to classify the object in the aerial image into an object type; and
adjusting a size of the clearance zone based upon the object type assigned to the object, wherein the clearance zone comprises an offset value added to the estimated height of the object and the offset value is adjusted based on the object type.

9. The method of claim 1, further comprising:
generating a shadow mask image from the aerial image, wherein the shadow mask image classifies pixels in the aerial image as either a shadow pixel or a non-shadow pixel,
wherein determining the pixel length of the shadow in the aerial image comprises determining the pixel length from the shadow mask along a sun-to-object axis.

10. The method of claim 1, further comprising:
comparing the estimated height of the object against a reference height for the object stored in a reference model for the ground area; and
updating the reference model for the ground area based on the aerial image when the estimated height deviates by at least a threshold amount from the reference height.

11. At least one non-transitory machine-readable storage medium storing instructions that, when executed by an unmanned aerial vehicle (UAV), will cause the UAV to perform operations comprising:
acquiring an aerial image of a ground area below an unmanned aerial vehicle (UAV);
analyzing the aerial image to identify a shadow in the aerial image cast by an object rising from the ground area;
determining a pixel length of the shadow in the aerial image;
transforming the pixel length of the shadow in the aerial image into an estimated length of the shadow along the ground area based at least in part on a UAV height above the ground area when acquiring the aerial image;
calculating an estimated height of the object based at least on the estimated length of the shadow transformed from the pixel length of the shadow using the UAV height above the ground area when acquiring the aerial image, and an angle of the sun when the aerial image is acquired; and
generating a clearance zone around the object having at least one dimension determined based on the estimated height, wherein the clearance zone represents a region in space to avoid when navigating the UAV.

12. At least one non-transitory machine-readable storage medium storing instructions that, when executed by a control system of an unmanned aerial vehicle (UAV), will cause the UAV to perform operations comprising:
acquiring an aerial image of a ground area below an unmanned aerial vehicle (UAV);
analyzing the aerial image to identify a shadow in the aerial image cast by an object rising from the ground area;
determining a pixel length of the shadow in the aerial image;
calculating an estimated height of the object based at least on the pixel length of the shadow, a UAV height above the ground area when acquiring the aerial image, and an angle of the sun when the aerial image is acquired;
generating a clearance zone around the object having at least one dimension determined based on the estimated height, wherein the clearance zone represents a region in space to avoid when navigating the UAV;
executing a machine learning model trained to classify the object in the aerial image into an object type; and
adjusting a size of the clearance zone based upon the object type assigned to the object, wherein the clearance zone comprises an offset value added to the estimated height of the object, wherein a first object type deemed to have a difficult to estimate shadow is assigned a larger clearance zone than a second object type not deemed to have the difficult to estimate shadow.

13. The at least one non-transitory machine-readable storage medium of claim 12, further storing instructions that, when executed by the control system, will cause the UAV to perform further operations, comprising:
measuring a position of the UAV and a time when acquiring the aerial image; and
determining the angle of the sun when the aerial image was acquired based on the position of the UAV and the time.

14. The at least one non-transitory machine-readable storage medium of claim 13, further storing instructions that, when executed by the control system, will cause the UAV to perform further operations, comprising:
transforming the pixel length of the shadow in the aerial image into an estimated length of the shadow along the ground area based on the UAV height above the ground area when acquiring the aerial image,
wherein calculating the estimated height of the object comprises calculating the estimated height of the object based on the estimated length of the shadow.

15. The at least one non-transitory machine-readable storage medium of claim 14, further storing instructions that, when executed by the control system, will cause the UAV to perform further operations, comprising:
measuring one or both of an attitude of the UAV or an angle of a camera when acquiring the aerial image, wherein transforming the pixel length of the shadow into the estimated length is based on the UAV height above the ground area and at least one of the attitude of the UAV or an angle of the camera.

16. The at least one non-transitory machine-readable storage medium of claim 12, further storing instructions that, when executed by the control system, will cause the UAV to perform further operations, comprising:
   measuring an aircraft heading of the UAV when acquiring the aerial image; and
   rotating the aerial image to a default orientation based on the aircraft heading prior to the analyzing of the aerial image.

17. The at least one non-transitory machine-readable storage medium of claim 12, wherein analyzing the aerial image to identify the shadow in the aerial image cast by the object comprises applying one or more intensity thresholds to the aerial image to identify the shadow.

18. The at least one non-transitory machine-readable storage medium of claim 12, wherein analyzing the aerial image to identify the shadow in the aerial image cast by the object comprises executing a machine learning model trained to identify shadows.

19. The at least one non-transitory machine-readable storage medium of claim 12, further storing instructions that, when executed by the control system, will cause the UAV to perform further operations, comprising:
   generating a shadow mask image from the aerial image, wherein the shadow mask image classifies pixels in the aerial image as either a shadow pixel or a non-shadow pixel,
   wherein determining the pixel length of the shadow in the aerial image comprises determining the pixel length from the shadow mask.

\* \* \* \* \*